J. BINGHAM.
ROLLER BEARING CAGE.
APPLICATION FILED SEPT. 28, 1917.
1,355,303.  Patented Oct. 12, 1920.
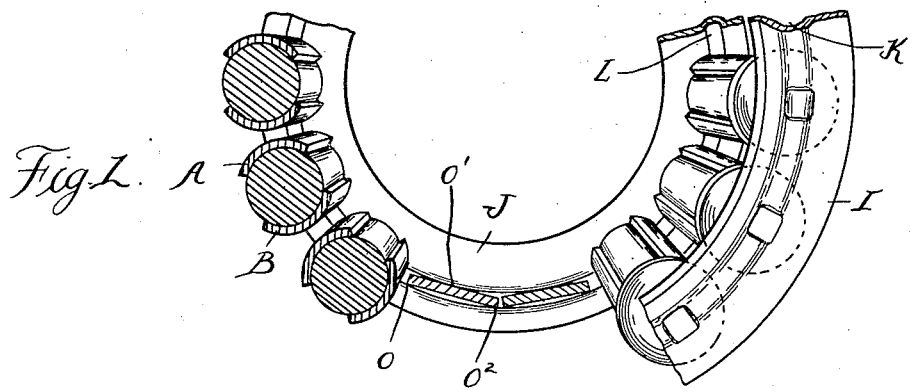
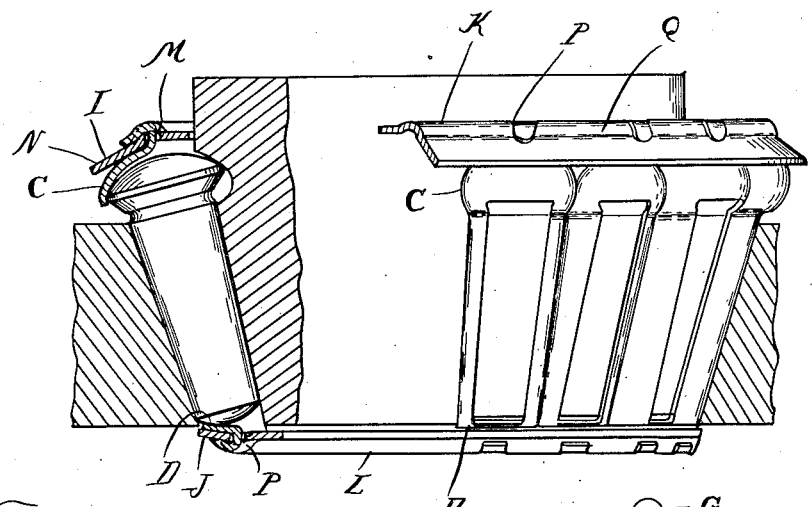
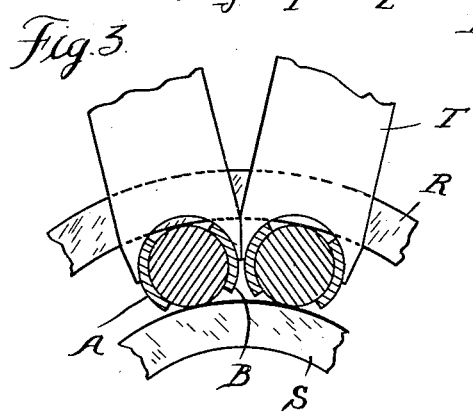
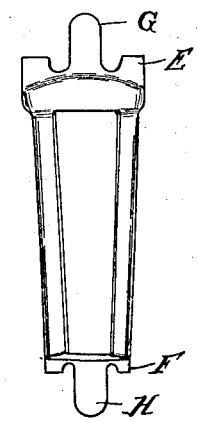
Inventor
Jeremiah Bingham
By Whittemore Hulbert & Whittemore
Attorneys

UNITED STATES PATENT OFFICE.

JEREMIAH BINGHAM, OF TOLEDO, OHIO, ASSIGNOR TO THE BOCK BEARING COMPANY, OF TOLEDO, OHIO, A CORPORATION OF OHIO.

ROLLER-BEARING CAGE.

1,355,303.   Specification of Letters Patent.   Patented Oct. 12, 1920.

Application filed September 28, 1917. Serial No. 193,717.

*To all whom it may concern:*

Be it known that I, JEREMIAH BINGHAM, a citizen of the United States of America, residing at Toledo, in the county of Lucas and State of Ohio, have invented certain new and useful Improvements in Roller-Bearing Cages, of which the following is a specification, reference being had therein to the accompanying drawings.

The invention relates to roller bearings of that type in which the rolls are first housed in individual cells and subsequently assembled in predetermined relation to each other. The present invention has particular reference to the construction of a cage formed of an assembled series of rolls and the means for imparting strength and rigidity thereto, as hereinafter set forth.

In the drawings:

Figure 1 is a sectional plan view of a cage formed of a series of housed rolls;

Fig. 2 is a cross-section therethrough;

Fig. 3 is a detail view showing the alining members holding the rolls;

Fig. 4 is a view of one of the roll cells or housings.

The individual cells or roll housings which are assembled to form the cage are preferably formed from pressed sheet-metal, comprising opposite segmental portions A and B connected by end portions C and D. These end portions C and D are provided with outwardly-extending flanges E and F, with tongues G and H projecting centrally from the flanges. I and J are connector rings, preferably formed of pressed sheet-metal, and which are provided with grooves K and L for receiving the flanges E and F of the individual cells and are also provided with slits or apertures M for receiving the tongues G and H. The apertures M are suitably spaced around the connector rings to produce the desired arrangement of the rolls. Where, as shown, the rolls are conical the rings I and J are of different diameters suitable to produce the proper alinement of the axes of the rolls in a common point of intersection. The larger ring I is preferably formed with an obliquely-extending flange N which forms an abutment or bearing for the upper ends C of the roll housings, and the oblique arrangement also braces and stiffens the ring. Thus when the tongues G and H are passed through the apertures M and bent over the flanges E and F will be retained in the grooves K and L; also the ends and central portions of these flanges will bear upon opposite sides of the grooves, thereby forming a three-point bearing, as indicated at O O' O², which will hold the individual cells or housings from turning. The tongues G when bent over preferably engage recesses or depressions P in the bead Q, which latter is formed by the pressing of the groove K in the blank, and this construction avoids any projection or roughness incident to the turning over of the tongues. It also provides greater clearance at the large end of the bearing which is sometimes essential to its use.

In assembling the cage, the roll cells or housings having the rolls therein are engaged with rings of suitable dimension, and it is obvious that the same housed roll units may be assembled in varying numbers with rings of different sizes. After the tongues are threaded through the slits in the rings they art bent over and secured by suitable closing dies. During the closing operation the rolls are held in true alinement, preferably as shown in Fig. 3, by being engaged with outer and inner bearing rings R and S and radial alining members T. Thus when pressure is brought to bear by the closing dies the cells will be secured in exactly predetermined positions, such as to hold all of the rolls with their axes intersecting a common point. Moreover the structure is a rigid one which will maintain the rolls in alinement when in service.

The cage constructed as described has a minimum of weight and maximum of strength and rigidity, and at the same time it can be manufactured at low cost and in various sizes, employing the same housed roll units.

What I claim as my invention is:

1. A roll-holding cage, comprising a series of individual roll-holding cells or housings having rolls therein, connector rings at opposite ends of said cells, one of said rings being strengthened, and means for attaching the cells to said rings for holding the same in exactly predetermined alinement and anchored against rotative adjustment.

2. A roll-holding cage, comprising a series of individual roll-holding cells or housings of tapering form and having conical rolls therein, connector rings for the opposite ends of said cells, the ring at the large end of the cells being provided with an oblique flange forming a bearing for the end of each cell, and tongues on said cells projecting through apertures in said ring and clenched to retain the same.

3. A roll-holding cage, comprising a series of individual roll-holding cells or housings of tapering form and having conical rolls therein, grooved connector rings at opposite ends of said housings, flanges projecting from the ends of said cells engaging said grooves with bearings on opposite sides thereof to form a non-rotative engagement, tongues projecting from said cells passing through apertures in said rings and clenched, and an oblique flange on the ring at the large end of said cells forming a bearing for the ends thereof and also trussing the ring to impart rigidity thereto.

4. A roll-holding cage, comprising a series of individual roll-holding cells or housings, a grooved connector ring at the ends of said housings, flanges projecting from said housings engaging the groove in said ring, having a two-point bearing on the outer face and an intermediate bearing on the inner face thereof, and a tongue on each cell or housing extending through an aperture in said ring and clenched.

5. A roller bearing cage, comprising a series of individual roll-holding cells or housings having rolls therein, a connector ring beaded to form a groove therein having spaced depressions in said bead with apertures therein, flanges projecting from said cells or housings engaging said groove to form a three-point contact therewith, and tongues projecting from said housings passing through the apertures in said ring and clenched in the recesses or depressions in said bead.

In testimony whereof I affix my signature.

JEREMIAH BINGHAM.